(12) United States Patent
Fischer

(10) Patent No.: US 10,000,157 B2
(45) Date of Patent: Jun. 19, 2018

(54) CONTROLLING DIMMING OF MIRRORS OR DISPLAYS USING DUAL-FUNCTION LIGHTING

(71) Applicant: Faraday&Future Inc., Gardena, CA (US)

(72) Inventor: Evan Roger Fischer, Torrance, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 238 days.

(21) Appl. No.: 15/143,322

(22) Filed: Apr. 29, 2016

(65) Prior Publication Data

US 2017/0313250 A1    Nov. 2, 2017

(51) Int. Cl.
| | |
|---|---|
| *B60R 1/08* | (2006.01) |
| *H04N 5/238* | (2006.01) |
| *H04N 7/18* | (2006.01) |
| *B60Q 1/44* | (2006.01) |
| *B60Q 1/26* | (2006.01) |
| *B60R 1/00* | (2006.01) |
| *B60R 1/12* | (2006.01) |
| *G01J 1/16* | (2006.01) |
| *G01J 1/42* | (2006.01) |
| *G01J 1/44* | (2006.01) |

(52) U.S. Cl.
CPC ............ *B60R 1/083* (2013.01); *B60Q 1/2603* (2013.01); *B60Q 1/44* (2013.01); *B60R 1/00* (2013.01); *B60R 1/1207* (2013.01); *G01J 1/16* (2013.01); *G01J 1/4204* (2013.01); *H04N 5/238* (2013.01); *H04N 7/181* (2013.01); *B60R 2001/1223* (2013.01); *B60R 2300/30* (2013.01); *G01J 2001/446* (2013.01)

(58) Field of Classification Search
CPC ......... B60R 1/083; B60R 1/00; B60R 1/1207; B60Q 1/2603; B60Q 1/44; G01J 1/16; G01J 1/4204; H04N 5/238; H04N 7/181
See application file for complete search history.

(56) References Cited

U.S. PATENT DOCUMENTS

| | | | | |
|---|---|---|---|---|
| 6,016,035 A | * | 1/2000 | Eberspacher | ........ B60Q 1/1423 307/10.8 |
| 2005/0002103 A1 | * | 1/2005 | Bechtel | ................ B60Q 1/1423 359/604 |

* cited by examiner

*Primary Examiner* — Mary Ellen Bowman
(74) *Attorney, Agent, or Firm* — Morrison & Foerster LLP

(57) ABSTRACT

A vehicle is disclosed. The vehicle includes a first indicator light associated with a first function or a first state of the vehicle (e.g., a brake light), and circuitry coupled to the first indicator light. The circuitry is configured to cause the first indicator light to emit light when the vehicle is performing the first function or is operating in the first state, and detect an amount of light incident on the first indicator light. Thus, the indicator light can be used to detect incoming light to perform various vehicle functions (e.g., automatically dimming mirrors based on the incoming light) without the need for a dedicated light sensor.

20 Claims, 4 Drawing Sheets

US 10,000,157 B2

CONTROLLING DIMMING OF MIRRORS OR DISPLAYS USING DUAL-FUNCTION LIGHTING

FIELD OF THE DISCLOSURE

This relates to a vehicle and, more particularly, to a vehicle comprising dual-functioning light-emitting diodes (LEDs) for emitting indicator lights and detecting incoming light.

BACKGROUND OF THE INVENTION

Auto-dimming mirrors are popular in consumer automobiles for their ability to reduce glare and therefore increase driver comfort during nighttime driving. When driving at night, bright lights, such as the headlights of vehicles behind the driver, can cause visual fatigue when reflected in one or more mirrors of a vehicle, such as one or more side view mirrors and/or rear view mirrors. Accordingly, vehicles can include automatically dimming mirrors with a variable tint that activates based on incoming light detected by one or more dedicated sensors built into the mirrors or elsewhere on the vehicles.

SUMMARY OF THE DISCLOSURE

This relates to a vehicle and, more particularly, to a vehicle comprising dual-functioning light-emitting diodes (LEDs) for emitting indicator lights and detecting incoming light. In some examples of the disclosure, one or more indicator lights, such as brake lights, reverse lights, and/or turn signals can include one or more dual-functioning LEDs. Dual-functioning LEDs according to examples of the disclosure can selectively operate as indicator lights in response to a vehicle action (e.g., braking) and as incoming light detectors. A measured level of incoming light can be used to control one or more of automatically dimming mirrors, display screen and indicator light brightness, and exterior camera exposure to decrease visual fatigue during nighttime driving. In some examples, a dual-functioning LED or LED array can be time-multiplexed as an emitter and as a detector to perform both tasks.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

This relates to a vehicle and, more particularly, to a vehicle comprising dual-functioning light-emitting diodes (LEDs) for emitting indicator lights and detecting incoming light. In some examples of the disclosure, one or more indicator lights, such as brake lights, reverse lights, and/or turn signals can include one or more dual-functioning LEDs. Dual-functioning LEDs according to examples of the disclosure can selectively operate as indicator lights in response to a vehicle action (e.g., braking) and as incoming light detectors. A measured level of incoming light can be used to control one or more of automatically dimming mirrors, display screen and indicator light brightness, and exterior camera exposure to decrease visual fatigue during nighttime. In some examples, a dual-functioning LED or LED array can be time-multiplexed as an emitter and as a detector to perform both tasks.

Figure 1:
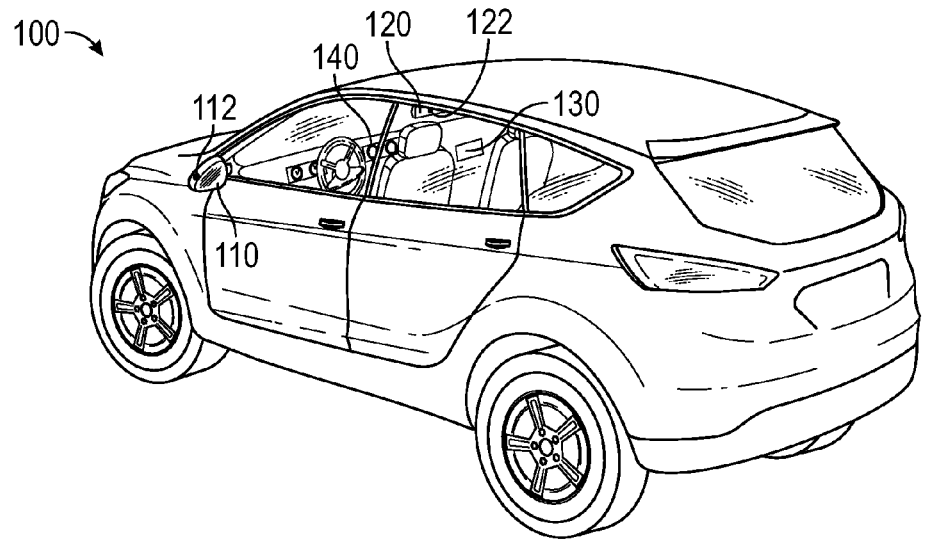
FIG. 1 illustrates a vehicle outfitted with incoming light sensors according to examples of the disclosure.

In some examples, a vehicle can be provided with one or more dedicated sensors for measuring intensity of light coming into the vehicle from surrounding traffic (e.g., from behind the vehicle). FIG. 1 illustrates a vehicle 100 outfitted with incoming light sensors 112 and 122 according to examples of the disclosure. In some examples, vehicle 100 can include side mirror 110 and rear view mirror 120. In some examples, vehicle 100 features an additional side mirror on the other side (not shown). Side mirror 110, the other side mirror (not shown), and rear view mirror 120 can automatically dim to reduce glare from headlights on vehicles behind vehicle 100, for example, as will be described in more detail below. In some examples, vehicle 100 can feature an infotainment panel 130 (e.g., an infotainment display screen) and illuminated instrument panel 140, which can both operate at a variety of brightness levels. Side mirror 110 and rear view mirror 120 can include incoming light sensors 112 and 122, respectively, to detect how much light is coming in from the rear of vehicle 100 so that the mirrors can be dimmed accordingly to reduce glare from incoming light, for example. In some examples, brightness levels of an infotainment panel 130 and an illuminated instrument panel 140 can also be adjusted based on incoming light detected at sensors 112 and 122 to be at a comfortable level for a driver or passengers of vehicle 100. Automatic dimming mirrors and automatically adjustable instrumentation and infotainment panels can make driving at night more comfortable for a driver by adjusting based on detected incoming light from other vehicles behind vehicle 100.

In some examples, incoming light sensors 112 and 122 can provide useful data to automatically dim mirrors 110 and 120 and displays 130 and 140. However, providing dedicated sensors 112 and 122 can add cost and complexity when building and maintaining vehicle 100, for example. Further, dedicated sensors 112 and 122 can consume space (e.g., on mirrors 110 and 120) that may be used for other purposes. Additionally, in some examples, one or more of side mirrors 110 and rear view mirror 120 can be replaced with cameras (not shown) and corresponding video monitors inside vehicle 100, such as infotainment panel 130. In some examples, alternate locations inside of vehicle 100 for such video monitors (not shown) are possible. When one or more mirrors 110 and/or 120 are eliminated, potential locations for including dedicated sensors 112 and 122 may be reduced.

Figure 2:
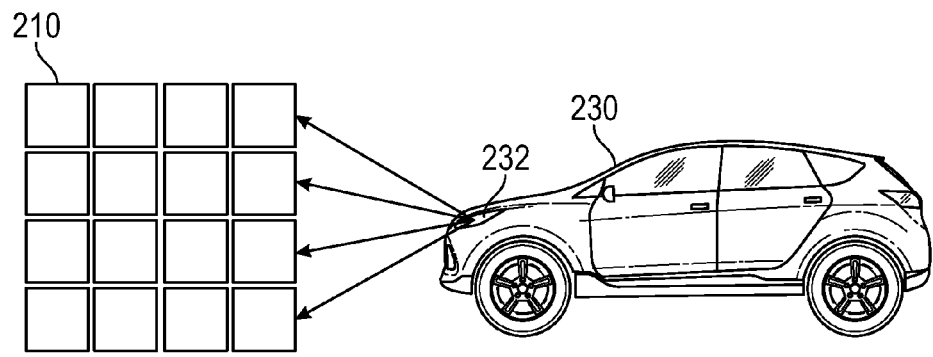
FIG. 2 illustrates an array of light-emitting diodes (LEDs) for detecting and emitting light according to examples of the disclosure.

In some examples, rather than providing dedicated incoming light sensors, existing lights on a vehicle can be used to both emit light (e.g., as brake lights) and to detect incoming light. FIG. 2 illustrates an array 210 of light-emitting diodes (LEDs) for detecting and emitting light according to examples of the disclosure. In some examples, LED array 210 can be located on the rear of a vehicle and serve as indicator lights associated with a vehicle function or state. For example, LED array 210 can be a brake light associated with applied brakes, taillights for improved visibility in low light conditions, or reverse lights associated with the vehicle driving in reverse. In some examples, LEDs, which may generally have a voltage applied to them to generate light, can generate reverse current and/or voltage when light is incident upon them. Because of this, in some examples, LEDs can be provided with circuitry, such as the example circuitry described below with reference to FIG. 3, to selectively operate an LED as an emitter of light and as a detector of light. Specifically, in some examples, LEDs in array 210 can be selectively configured to emit light in accordance with an associated vehicle function or state, and to detect incoming light, such as light from headlights 232 of vehicle 230. Vehicle 230 can be driving behind a vehicle incorporating LED array 210 as brake lights or reverse lights, for example. Incoming light detected at LED array 210 can be used for automatically dimming mirrors and/or displays in the vehicle of the disclosure, as described above with reference to FIG. 1, and as will be described in more detail with reference to FIG. 3. In some examples, LED array 210 can additionally or alternatively be part of a headlight assembly of the vehicle of the disclosure to emit light as headlights, and to detect headlights from oncoming traffic as part of an auto-dimming headlight system. By determining an incoming level of light at the front of the vehicle, the vehicle's headlights can operate at an increased intensity when there is no oncoming traffic and can operate at a reduced intensity when oncoming traffic is detected, for example.

Figure 3:
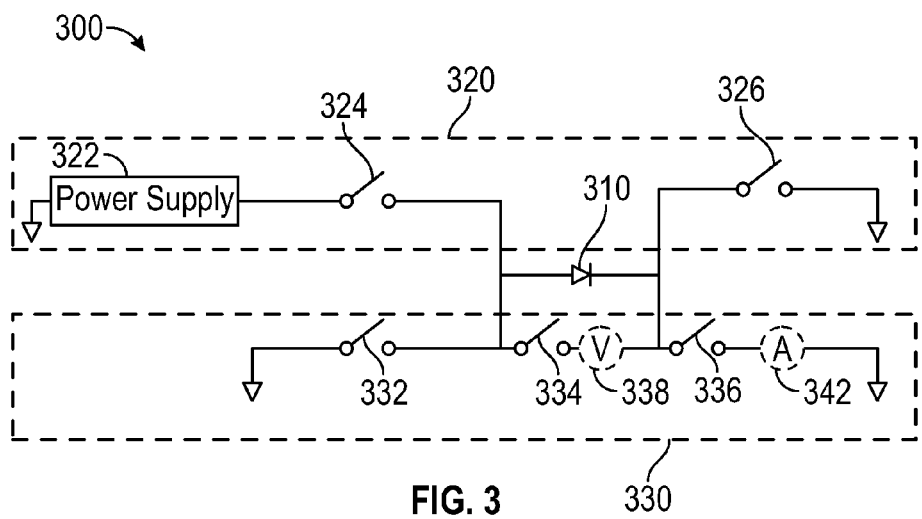
FIG. 3 illustrates circuitry for selectively coupling a light-emitting diode (LED) to an emitter circuit and to a detector circuit.

As previously stated, in some examples, one or more lights associated with a vehicle function or state (e.g., brake lights) can be selectively configured to emit an indicator light when appropriate, and to detect incoming light. FIG. 3 illustrates circuitry 300 for selectively coupling a light-emitting diode (LED) 310 to an emitter circuit 320 and to a detector circuit 330. LED 310 can correspond to one or more LEDs included in array 210 described with reference to FIG. 2, for example. To operate as an indicator light, LED 310 can be operated with emitter circuit 320, for example. In some examples, emitter circuit 320 can include a power supply 322 to illuminate LED 310 and switches 324 and 326 for connecting LED 310 to the emitter circuit 320. Power supply 322 can provide a voltage or a current to LED 310 when switches 324 and 326 are closed to cause it to illuminate, for example. To operate as an incoming light detector, LED 310 can be coupled to detector circuit 330 via switches 332, 334, and 336, for example. In some examples, detector circuit 330 can include one or more of a voltmeter 338 and an ammeter 342 to measure voltage or current, respectively, generated by LED 310 in response to light incident upon LED 310. When LED 310 is operating as an incoming light detector, switches 324 and 326 can be open. Further, when ammeter 342 is measuring current generated by LED 310, switches 332 and 336 can be closed, and switch 334 can be open. When voltmeter 338 is measuring voltage generated by LED 310, switches 332 and 336 can be open, and switch 334 can be closed. It is understood that the emitter 320 and detector 330 circuits illustrated in FIG. 3 are exemplary only, and that other circuit configurations that allow for LED 310 to emit and detect light can be utilized. Providing LED 310 with switchable connections to emitter circuit 320 and detector circuit 330 allows LED 310 to selectively operate as both an emitter and as a detector, thus reusing an existing component of a vehicle (e.g. an LED indicator light) for an additional function (e.g. detecting incoming light).

In some examples, dual-functioning LEDs, such as LED 310 described with reference to FIG. 3, can operate as an emitter at some times and as a detector at other times. Providing dual-functioning LEDs for a variety of vehicle functions, such as one or more of reverse lights, brake lights, turn signals and tail lights, can allow one or more LEDs or LED arrays 210 to operate as emitters while one or more other LEDs or LED arrays 210 operate as detectors, for example. In some examples, functionality can be dynamically determined for each LED or LED array based on when one or more LEDs or LED arrays are operating as indicators. For example, when braking, one or more vehicle brake lights may operate as emitters while one or more reverse lights operate as detectors. In some examples, reverse lights can be advantageous as dual-functioning LEDs because they are generally not used when a vehicle is driving forward.

Providing multiple LED arrays at different locations on the vehicle as detectors can be advantageous for detecting variation in incoming light depending on spatial location, thus allowing one or more mirrors and/or displays to be independently dimmed, for example. For example, when a vehicle is driving in a leftmost lane on a road, more incoming light may be present on a right half of the vehicle. Based on a higher detected intensity of light on a right half of the vehicle (e.g., at a right-side brake light LED array) than on a left half of the vehicle (e.g., at a left-side brake light LED), a right side view mirror can be dimmed more than a left side view mirror, for example. In some examples, the detection of light and/or dimming of mirrors on the left and right sides of the vehicle can be performed independently of one another.

Figure 4A:
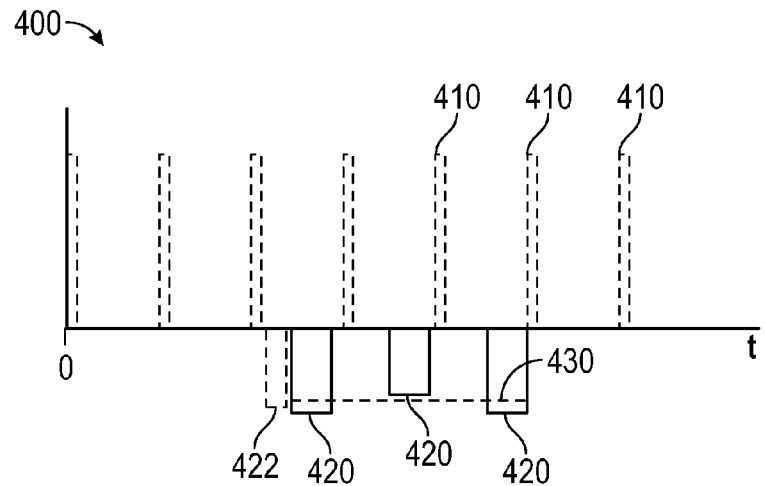
FIG. 4A illustrates a timing diagram for multiplexing an LED array as an emitter and as a detector according to examples of the disclosure.

In some examples, one or more LEDs or LED arrays can be time-multiplexed to switch between operating as emitters and operating as detectors. FIG. 4A illustrates a timing diagram 400 for multiplexing an LED or LED array as an emitter and as a detector according to examples of the disclosure. In some examples, LED arrays, such as array 210 described with reference to FIG. 2, can be operated as indicators with a duty cycle (e.g., to save power) by flashing on and off, as shown for example in FIG. 4A as indicator periods 410. Indicator periods 410 can include coupling an LED, such as LED 310 described with reference to FIG. 3, to a power supply 322 to illuminate light, for example. Indicator periods 410 can occur in response to a driver input (or autonomous vehicle decision) to perform a vehicle function or operate the vehicle in a given state that causes light to be emitted at an LED (e.g., applying the vehicle's brake, activating the vehicle's turn signal, etc.). In some examples, indicator periods 410 can operate at a high enough frequency such that, to a human eye, it can appear as though the LED is continuously illuminated. A duty cycle of indicator periods 410 can be adjusted to modify a perceived intensity of an associated LED, for example. In some examples, between indicator periods 410, an LED can be operated as a detector with detector periods 420. During detector periods 420, an LED, such as LED 310, can be coupled to a detector circuit 330, for example, to measure incoming light. In some examples, LED 310 can produce a current or a voltage at a level indicative of a level of incoming light, as shown by the variation in amplitudes of detector periods 420. Over several detector periods 420, an average incoming level of light 430 can be determined. In some examples, light produced during emitter periods 410 can be detected during detector periods 420. These measurements, known as "self-glare" 422 can interfere with determining an accurate average 430 of incoming light. In some examples, self-glare 422 can include a measurement at a first LED of a reflection of emitted light from that same LED. In some examples, self-glare can include a measurement at a first LED of incoming light from a neighboring LED not fully synchronized with the first LED (e.g., one LED detects light while an LED next to it emits light). To avoid capturing self-glare 422, detector cycles 420 can occur a threshold period of time (e.g., a predefined period of time) after emitter cycles 410 end to improve the accuracy of the average level of incoming light 430.

In some examples, an LED 310 may operate as one of an emitter or a detector for a period of time, rather than switching, via time multiplexing, between the two modes as described above. To operate as an emitter only, for example, emitter periods 410 can be performed without detector periods 420. For example, during daytime, a brake light may operate only to indicate braking without operating as an incoming light detector. In some examples, one or more LEDs associated with a vehicle action may only operate as an indicator while other lights only operate as detectors (e.g., at night). For example, while driving forward at night, reverse lights can be used to detect incoming light (e.g., without emitting any light) while rear taillights can be illuminated to increase visibility (e.g., without operating as light detectors). To operate as a detector only, for example, detector periods 420 can be performed without emitter periods 410. When operating as a detector only, LED 310 can sample incoming light with a duty cycle, as shown in FIG. 4A for example, or continuously, in some examples. When operating as a detector only, self-glare is less likely to be detected, and an average incoming light value 430 can be more accurate.

In some examples, a light source can be identified based on a measured duty cycle of incoming light. As described with reference to FIG. 4A, many vehicles' headlights emit light with a duty cycle that is less than 100%. In some examples, a voltage or current produced by an LED configured as a detector in response to incident light may have a same or substantially similar duty cycle as the incident light. Therefore, a duty cycle of incident light can be determined based on a duty cycle of the voltage or current generated by the LED in response to the incident light. Based on the determined duty cycle of light incident on an LED on the vehicle (e.g., LED 310), a processor included in the vehicle according to examples of the disclosure can determine whether a source of incoming light is a headlight. In some examples, in accordance with a determination that an incoming light source is a headlight, one or more mirrors and/or displays can be dimmed or adjusted to reduce glare. In accordance with a determination that an incoming light source is not a headlight (e.g. a streetlight, moonlight, sunlight, etc.) the one or more mirrors and/or displays can remain unchanged, for example.

Figure 4B:
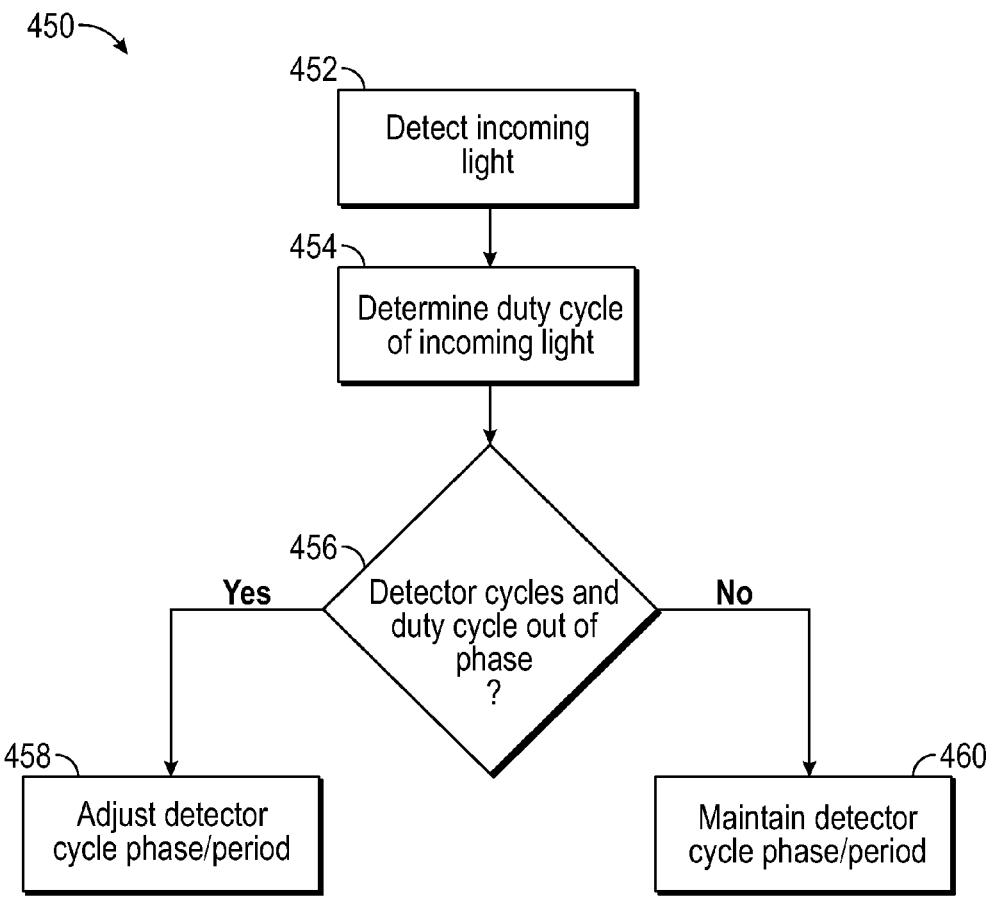
FIG. 4B illustrates a method of modifying detector cycle timing based on the duty cycle of detected light according to examples of the disclosure.

In some examples, a phase or period of detector cycles 420 described with reference to FIG. 4A can be modified based on the duty cycle(s) of detected light to ensure they are not out of phase with headlights of vehicles behind the vehicle. FIG. 4B illustrates a method 450 of modifying detector cycle timing based on the duty cycle of detected light according to examples of the disclosure. At 452, light can be detected at an LED or LED array, as described in this disclosure, such as with reference to FIG. 4A. At 454, the vehicle can determine the duty cycle(s) of the light detected at 452. In some examples, the duty cycle(s) of the light detected at 452 can be determined based on the duty cycle(s) of the voltage or current generated by the LED in response to the light incident on the LED (e.g., the duty cycle of the detected light can be the same as the duty cycle of the generated voltage or current). At 456, the vehicle can compare the phase and/or period of detector cycles 420 used to detect the incoming light (described above with reference to FIG. 4A) to the duty cycle(s) of the detected light determined at 454. If the detector cycles 420 are out of phase with the duty cycle(s) of the detected light, at 458, the vehicle can modify the phase and/or period of detector cycles 420 to substantially (or better) align with the duty cycle(s) of the detected light. In this way, the accuracy and/or effectiveness of detecting the incident light at the LED can be improved. If the detector cycles 420 are not out of phase with the duty cycle(s) of the detected light, at 460, the phase and/or period of the detector cycles 420 can be maintained. In some examples, after method 450 is performed, the vehicle can continue to detect light at the LED or LED array in question. In some examples, method 450 can be performed continuously while light is being detected at a given LED or LED array; in some examples, method 450 can be performed at fixed-time intervals (e.g., every 5, 10 or 20 minutes).

Some vehicles according to the disclosure may use cameras and associated displays to perform side and rear view mirror functions, in lieu of one or more side mirrors and/or rear view mirrors. To increase driver comfort at night, in some examples, these systems can similarly be modified in accordance with incoming light from headlights behind the vehicle. For example, one or more displays used for these purposes can be dimmed in accordance with a low level of detected light. In some examples, an aperture, frame rate, or other characteristic of a camera used for these purposes can be adjusted to modify the contrast of captured photos and/or videos to improve clarity based on a detected lighting condition. In some examples, other systems and modifications in accordance with a detected level of light are possible.

Figure 5:
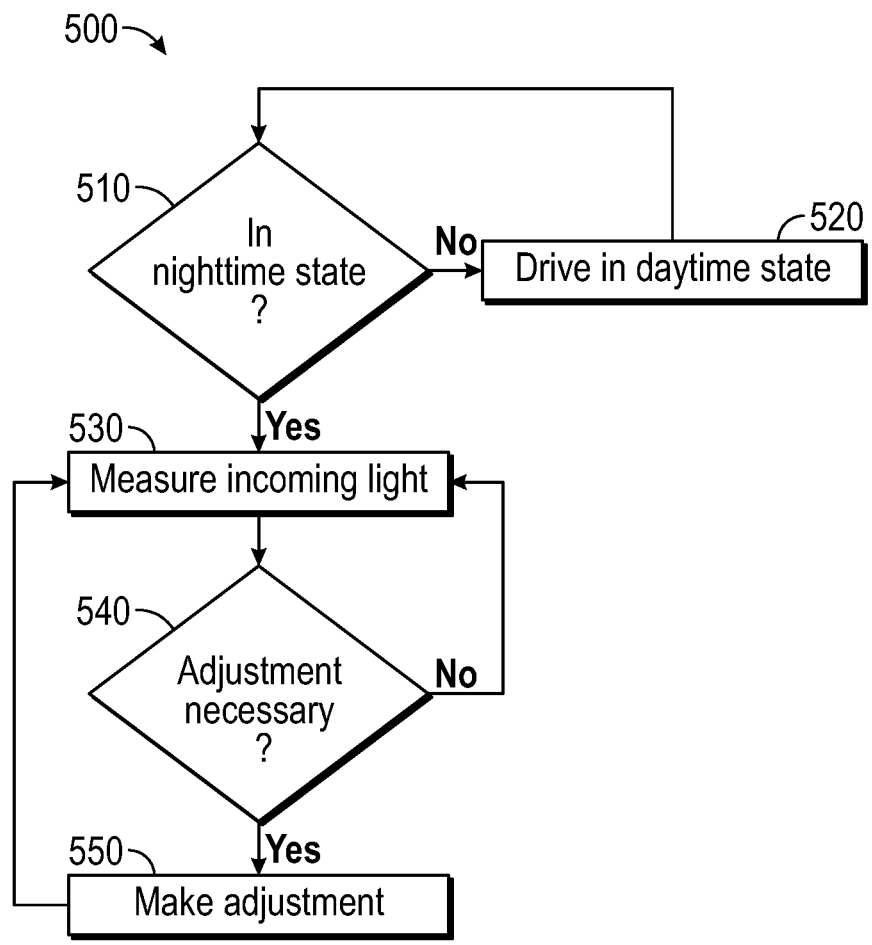
FIG. 5 illustrates a method for controlling one or more mirrors and/or display screens in response to incoming light according to examples of the disclosure.

FIG. 5 illustrates a method 500 for controlling one or more mirrors and/or display screens in response to incoming light according to examples of the disclosure. In some examples, in step 510, one or more sensors in the vehicle (e.g., ambient light sensors, clocks, other information sources) can be used to determine whether it is nighttime (or any time when a level of ambient light in the vehicle's surroundings is below a threshold level, such as when the vehicle is in a tunnel). In some examples, determining whether it is nighttime can include using a clock and a GPS to determine local time. In accordance with a determination that it is daytime, a vehicle according to examples of the disclosure can operate in a daytime state 520, for example. In some examples, operating in a daytime state 520 can include settings for daytime running lights and interior lights. Rear incoming light sampling, as described above, is optionally not performed in a daytime state 520, for example. During a daytime state 520, ambient light sensors and/or local time can be sampled periodically to continue to determine whether or not it is nighttime, for example. In accordance with a determination that it is nighttime, rear incoming light can be measured at step 530 in some examples. In some examples, measuring incoming light can include operating one or more of dual-functioning LED 310 and/or LED array 210 as light detectors (e.g. using detector circuit 330). One or more dual-functioning LEDs can be multiplexed between incoming light detection and indicator light emission, as described with reference to FIG. 4A, for example. Based on an average incoming light level 430, a determination 540 can be made in some examples whether an adjustment to one or more mirrors and/or displays is necessary. For example, when an amount of incoming light exceeds a predetermined threshold, one or more mirrors and/or displays may be dimmed, accordingly. When the amount of incoming light falls below a predetermined threshold, one or more mirrors and/or displays may be brightened (e.g., dimming may be reduced), accordingly. In some examples, determination 540 can include a hysteresis point. Determining a hysteresis point associated with whether an adjustment is necessary includes determining a first (e.g., higher light) threshold for dimming one or more mirrors and/or displays and a second (e.g., lower light) threshold for brightening one or more mirrors and/or displays. Providing multiple thresholds allows the system to respond when necessary without becoming overresponsive and producing visual "flutter" in dimming or brightening the mirrors and/or displays, for example. If no adjustment is determined to be necessary at 540, process 500 can return to measuring incoming light at 530. Based on a determination that an adjustment is necessary at 540, an appropriate adjustment can be made in step 550. For example, in accordance with a determination that incoming light has increased (e.g., above a predetermined threshold), one or more mirrors and/or displays can be dimmed and/or an aperture of an exterior camera can be reduced. In some examples, in accordance with a determination that incoming light has decreased (e.g., below a predetermined threshold), one or more mirrors and/or displays can be brightened and/or an aperture of an exterior camera can be increased. Incoming light can be measured once again at step 530 following the adjustment made at 540.

Figure 6:
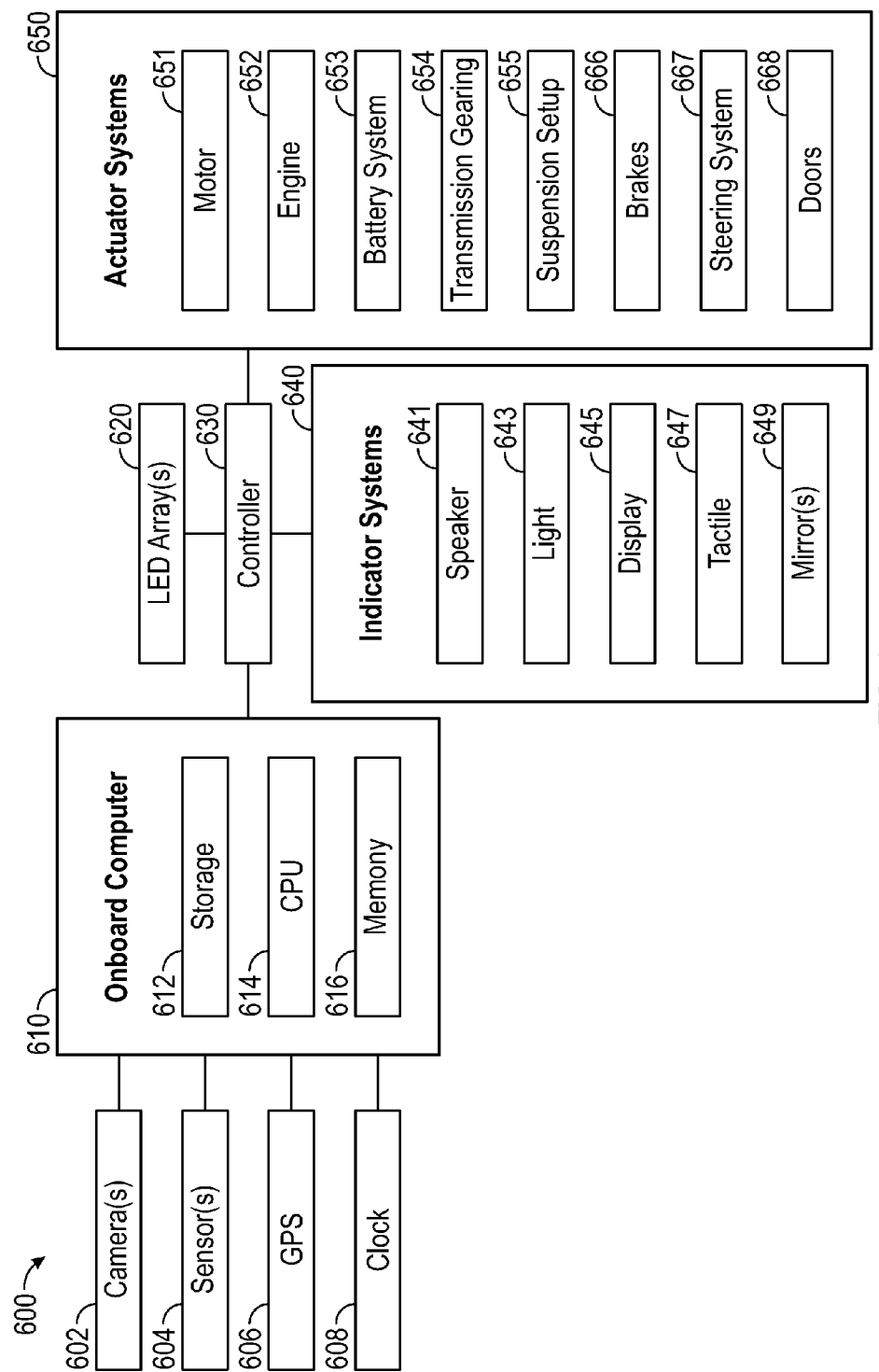
FIG. 6 illustrates a block diagram of a vehicle according to examples of the disclosure.

FIG. 6 illustrates a block diagram of a vehicle 600 according to examples of the disclosure. In some examples, vehicle 600 can include one or more cameras 602, one or more sensors 604, GPS 606, and clock 608. These systems can be used to determine whether it is nighttime based on detected light, vehicle location, and/or local time, for example. In some examples, vehicle 600 can further include onboard computer 610, configured for controlling one or more systems of the vehicle 600 and executing any of the methods described with reference to FIGS. 2-5 above. Onboard computer 610 can receive inputs from cameras 602, sensors 604, GPS 606 and/or clock 608. In some examples, onboard computer 610 can include storage 612, processor 614, and memory 616. Vehicle 600 can include, in some examples, controller 630 operatively coupled to onboard computer 610, one or more dual-functioning LEDs or LED arrays 620 according to the above, one or more actuator systems 650, and/or one or more indicator systems 640. In some examples, dual-functioning LEDs or LED arrays 620 can function as indicator lights associated with a vehicle action (e.g. brake lights, turn signals, and/or reverse lights) and/or safety lights such as headlights or taillights. Onboard computer 610 can control, via controller 630, the one or more LEDs or LED arrays 620 to emit light and/or to detect incoming light, according to the examples described above with reference to FIGS. 1-5, for example. In some examples, actuator systems 650 can include a motor 651 or engine 652, a battery system 653, transmission gearing 654, suspension setup 655, brakes 666, steering system 667, and doors 668. Any of actuator systems 650 can have indicator LEDs or LED arrays associated therewith, such as dual-functioning LEDs or LED arrays 620. For example, brakes 666 can be associated with a dual-functioning LED array brake light, and can be used to emit and/or detect light, as described in this disclosure. In some examples, controller 630 can be operatively coupled to one or more indicator systems 640, such as speaker 641, light 643, display 645, tactile indicator 647, and mirror(s) 649. In accordance with a determined incoming light level according to the above disclosure, onboard computer 610, via controller 630, can modify one or more indicator systems 640 (e.g., as described in method 500). For example, a brightness of one or more displays 645 and/or a dimness of one or more mirrors 649 can be modified based on measured incoming light. In some examples, one or more indicators 640 can indicate when an auto-dimming feature for one or more mirrors and/or displays is activated. Other systems and functions are possible.

Therefore, according to the above, some examples of the disclosure are directed to a vehicle comprising: a first indicator light associated with a first function or a first state of the vehicle; and circuitry coupled to the first indicator light, the circuitry configured to: cause the first indicator light to emit light when the vehicle is performing the first function or is operating in the first state; and detect an amount of light incident on the first indicator light. Additionally or alternatively to one or more of the examples disclosed above, in some examples, the first indicator light comprises an LED configured to generate a reverse current or a reverse voltage when light is incident upon the LED. Additionally or alternatively to one or more of the examples disclosed above, in some examples, the first indicator light comprises a brake light of the vehicle, and the circuitry is configured to cause the first indicator light to emit light when a brake system of the vehicle is activated. Additionally or alternatively to one or more of the examples disclosed above, in some examples, the first indicator light comprises a reverse light of the vehicle, and the circuitry is configured to cause the first indicator light to emit light when the vehicle is operated in a reverse drive mode. Additionally or alternatively to one or more of the examples disclosed above, in some examples, the vehicle further comprises: a dimmable mirror; and a processor configured to control an amount of dimming of the dimmable mirror based on the amount of light detected at the first indicator light. Additionally or alternatively to one or more of the examples disclosed above, in some examples, the vehicle further comprises: a second indicator light associated with a second function or a second state of the vehicle, wherein: the circuitry is further coupled to the second indicator light, and the circuitry is further configured to: cause the second indicator light to emit light when the vehicle is performing the second function or is operating in the second state; and detect an amount of light incident on the second indicator light. Additionally or alternatively to one or more of the examples disclosed above, in some examples, the first function is different from the second function, and the first state is different from the second state. Additionally or alternatively to one or more of the examples disclosed above, in some examples, the vehicle further comprises: a first dimmable mirror; a second dimmable mirror; and a processor configured to: control an amount of dimming of the first dimmable mirror based on the amount of light detected at the first indicator light; and independently of controlling the amount of dimming of the first dimmable mirror, control an amount of dimming of the second dimmable mirror based on the amount of light detected at the second indicator light. Additionally or alternatively to one or more of the examples disclosed above, in some examples, the first dimmable mirror comprises a left side view mirror, the first indicator light is disposed on a left side of a rear of the vehicle, the second dimmable mirror comprises a right side view mirror, and the second indicator light is disposed on a right side of the rear of the vehicle. Additionally or alternatively to one or more of the examples disclosed above, in some examples, the vehicle further comprises: a dimmable mirror; and a processor configured to: control an amount of dimming of the dimmable mirror based on the amount of light detected at the first indicator light and the amount of light detected at the second indicator light. Additionally or alternatively to one or more of the examples disclosed above, in some examples, the dimmable mirror comprises a rear view mirror. Additionally or alternatively to one or more of the examples disclosed above, in some examples, the vehicle further comprises: a dimmable mirror; and a processor configured to: in accordance with a determination that the vehicle is performing the first function or is operating in the first state: cause the first indicator light to emit light; and control an amount of dimming of the dimmable mirror based on the amount of light detected at the second indicator light; and in accordance with a determination that the vehicle is performing the second function or is operating in the second state: cause the second indicator light to emit light; and control the amount of dimming of the dimmable mirror based on the amount of light detected at the first indicator light. Additionally or alternatively to one or more of the examples disclosed above, in some examples, while the vehicle is performing the first function or is operating in the first state, emitting the light by the first indicator light and detecting the amount of light incident on the first indicator light are time-multiplexed by: driving, using the circuitry, the first indicator light to emit the light during one or more indicator time periods; and detecting, using the circuitry, the amount of light incident on the first indicator light during one or more detector time periods, the one or more detector time periods separated from the one or more indicator time periods by a predefined amount of time. Additionally or alternatively to one or more of the examples disclosed above, in some examples, the circuitry is further configured to: determine whether a duty cycle of the light incident on the first indicator light is out of phase with the one or more detector time periods; in accordance with a determination that the duty cycle of the light incident on the first indicator light is out of phase with the one or more detector time periods, adjust a phase or a period of the one or more detector time periods to substantially align with the duty cycle of the light incident on the first indicator light; and in accordance with a determination that the duty cycle of the light incident on the first indicator light is not out of phase with the one or more detector time periods, forgo adjusting the phase or the period of the one or more detector time periods. Additionally or alternatively to one or more of the examples disclosed above, in some examples, the vehicle further comprises: a dimmable mirror; and a processor configured to: determine one or more characteristics of the light incident on the first indicator light, wherein a first amount of light is detected at the first indicator light; in accordance with a determination that the one or more characteristics comprise a first characteristic, control an amount of dimming of the dimmable mirror based on the first amount of light detected at the first indicator light; and in accordance with a determination that the one or more characteristics do not comprise the first characteristic, forgo controlling the amount of dimming of the dimmable mirror based on the first amount of light detected at the first indicator light. Additionally or alternatively to one or more of the examples disclosed above, in some examples, determining that the one or more characteristics comprise the first characteristic comprises determining that the light is generated by a headlight of another vehicle. Additionally or alternatively to one or more of the examples disclosed above, in some examples, determining that the one or more characteristics do not comprise the first characteristic comprises determining that the light is sunlight or moonlight. Additionally or alternatively to one or more of the examples disclosed above, in some examples, the vehicle further comprises: a camera coupled to a display configured to display one or more images captured by the camera; and a processor configured to control an amount of dimming of the display and/or a characteristic of the camera based on the amount of light detected at the first indicator light.

Some examples of the disclosure are directed to a non-transitory computer-readable medium including instructions, which when executed by one or more processors, cause the one or more processors to perform a method comprising: emitting light at a first indicator light, associated with a first function or a first state of a vehicle, in response to the vehicle performing the first function or operating in the first state; and detecting an amount of light incident on the first indicator light.

Some examples of the disclosure are directed to a method comprising: emitting light at a first indicator light, associated with a first function or a first state of a vehicle, in response to the vehicle performing the first function or operating in the first state; and detecting an amount of light incident on the first indicator light.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A vehicle comprising:
a first indicator light associated with a first function or a first state of the vehicle; and
circuitry coupled to the first indicator light, the circuitry configured to:
cause the first indicator light to emit light when the vehicle is performing the first function or is operating in the first state; and
detect an amount of light incident on the first indicator light.

2. The vehicle of claim 1, wherein the first indicator light comprises an LED configured to generate a reverse current or a reverse voltage when light is incident upon the LED.

3. The vehicle of claim 1, wherein the first indicator light comprises a brake light of the vehicle, and the circuitry is configured to cause the first indicator light to emit light when a brake system of the vehicle is activated.

4. The vehicle of claim 1, wherein the first indicator light comprises a reverse light of the vehicle, and the circuitry is configured to cause the first indicator light to emit light when the vehicle is operated in a reverse drive mode.

5. The vehicle of claim 1, further comprising:
a dimmable mirror; and
a processor configured to control an amount of dimming of the dimmable mirror based on the amount of light detected at the first indicator light.

6. The vehicle of claim 1, further comprising:
a second indicator light associated with a second function or a second state of the vehicle, wherein:
the circuitry is further coupled to the second indicator light, and the circuitry is further configured to:
cause the second indicator light to emit light when the vehicle is performing the second function or is operating in the second state; and
detect an amount of light incident on the second indicator light.

7. The vehicle of claim 6, wherein the first function is different from the second function, and the first state is different from the second state.

8. The vehicle of claim 6, further comprising:
a first dimmable mirror;
a second dimmable mirror; and
a processor configured to:
control an amount of dimming of the first dimmable mirror based on the amount of light detected at the first indicator light; and
independently of controlling the amount of dimming of the first dimmable mirror, control an amount of dimming of the second dimmable mirror based on the amount of light detected at the second indicator light.

9. The vehicle of claim 8, wherein the first dimmable mirror comprises a left side view mirror, the first indicator light is disposed on a left side of a rear of the vehicle, the second dimmable mirror comprises a right side view mirror, and the second indicator light is disposed on a right side of the rear of the vehicle.

10. The vehicle of claim 6, further comprising:
a dimmable mirror; and
a processor configured to:
control an amount of dimming of the dimmable mirror based on the amount of light detected at the first indicator light and the amount of light detected at the second indicator light.

11. The vehicle of claim 10, wherein the dimmable mirror comprises a rear view mirror.

12. The vehicle of claim 6, further comprising:
a dimmable mirror; and
a processor configured to:
in accordance with a determination that the vehicle is performing the first function or is operating in the first state:
cause the first indicator light to emit light; and
control an amount of dimming of the dimmable mirror based on the amount of light detected at the second indicator light; and
in accordance with a determination that the vehicle is performing the second function or is operating in the second state:
cause the second indicator light to emit light; and
control the amount of dimming of the dimmable mirror based on the amount of light detected at the first indicator light.

13. The vehicle of claim 1, wherein while the vehicle is performing the first function or is operating in the first state, emitting the light by the first indicator light and detecting the amount of light incident on the first indicator light are time-multiplexed by:
driving, using the circuitry, the first indicator light to emit the light during one or more indicator time periods; and
detecting, using the circuitry, the amount of light incident on the first indicator light during one or more detector time periods, the one or more detector time periods separated from the one or more indicator time periods by a predefined amount of time.

14. The vehicle of claim 13, wherein the circuitry is further configured to:
determine whether a duty cycle of the light incident on the first indicator light is out of phase with the one or more detector time periods;
in accordance with a determination that the duty cycle of the light incident on the first indicator light is out of phase with the one or more detector time periods, adjust a phase or a period of the one or more detector time periods to substantially align with the duty cycle of the light incident on the first indicator light; and
in accordance with a determination that the duty cycle of the light incident on the first indicator light is not out of phase with the one or more detector time periods, forgo adjusting the phase or the period of the one or more detector time periods.

15. The vehicle of claim 1, further comprising:
a dimmable mirror; and
a processor configured to:
determine one or more characteristics of the light incident on the first indicator light, wherein a first amount of light is detected at the first indicator light;
in accordance with a determination that the one or more characteristics comprise a first characteristic, control an amount of dimming of the dimmable mirror based on the first amount of light detected at the first indicator light; and
in accordance with a determination that the one or more characteristics do not comprise the first characteristic, forgo controlling the amount of dimming of the dimmable mirror based on the first amount of light detected at the first indicator light.

16. The vehicle of claim 15, wherein determining that the one or more characteristics comprise the first characteristic comprises determining that the light is generated by a headlight of another vehicle.

17. The vehicle of claim 15, wherein determining that the one or more characteristics do not comprise the first characteristic comprises determining that the light is sunlight or moonlight.

18. The vehicle of claim 1, further comprising:
a camera coupled to a display configured to display one or more images captured by the camera; and
a processor configured to control an amount of dimming of the display and/or a characteristic of the camera based on the amount of light detected at the first indicator light.

19. A non-transitory computer-readable medium including instructions, which when executed by one or more processors, cause the one or more processors to perform a method comprising:
emitting light at a first indicator light, associated with a first function or a first state of a vehicle, in response to the vehicle performing the first function or operating in the first state; and
detecting an amount of light incident on the first indicator light.

20. A method comprising:
emitting light at a first indicator light, associated with a first function or a first state of a vehicle, in response to the vehicle performing the first function or operating in the first state; and
detecting an amount of light incident on the first indicator light.

* * * * *